(No Model.)
C. ESPLIN.
ELEVATOR GEARING.
No. 304,810. Patented Sept. 9, 1884.
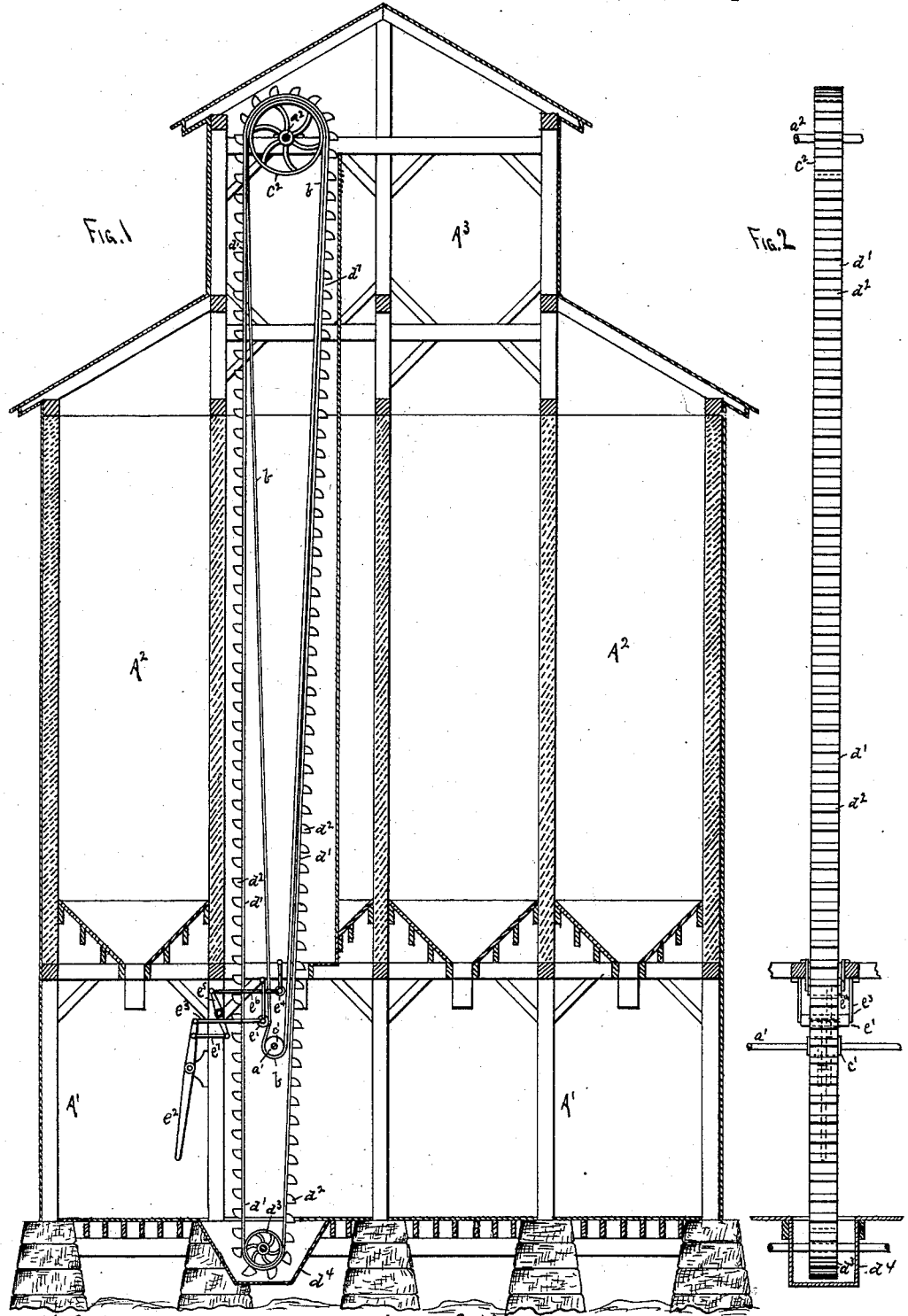

UNITED STATES PATENT OFFICE.

CHARLES ESPLIN, OF MINNEAPOLIS, MINNESOTA.

ELEVATOR-GEARING.

SPECIFICATION forming part of Letters Patent No. 304,810, dated September 9, 1884.

Application filed July 14, 1884. (No model.)

*To all whom it may concern:*

Be it known that I, CHARLES ESPLIN, a subject of the Queen of Great Britain and Ireland, who has declared his intention of becoming a citizen of the United States, and a resident of Minneapolis, in the county of Hennepin, in the State of Minnesota, have invented certain new and useful Improvements in Elevator-Gearing, of which the following specification is a full, clear, and exact description, reference being also had to the accompanying drawings, in which—

Figure 1 is a sectional elevation of an elevator, showing my improvements arranged therein. Fig. 2 represents a side view of the gearing, detached.

$A'$ represents the lower or bin-supporting frame, $A^2$ the bins, and $A^3$ the roof-frame, all arranged in the ordinary manner.

$a'$ represents the main driving-shaft, mounted in suitable bearings on the lower frame, $A'$, and adapted to be driven in any suitable manner.

$a^2$ is a short elevator-head shaft, parallel with the shaft $a'$, and supported upon suitable bearings across the roof-frame $A^3$, and adapted to be driven by a belt, $b$, from a pulley, $c'$, on the shaft $a'$ to a pulley, $c^2$, on the shaft $a^2$, as shown.

$d'$ is the elevator-belt, armed with the ordinary buckets, $d^2$, and running over the outside of the belt $b$ and pulley $c^2$, the head-pulley $c^2$ thus supporting the two belts, one running over and in contact with the other. The lower end of the belt $d'$ runs over the usual "boot-pulley," $d^3$, in a "boot-hopper," $d^4$. The belt $b$ is loose enough so that it will require a tightener, $e'$, to connect it with the shaft $c'$. The tightener may be operated by a rack and pinion, screw, or any other suitable means; but for the purpose of illustration I have shown a simple lever, $e^2$, and connecting-rod $e^3$ to operate it.

$e^4$ is a small pulley, connected by a pivoted lever, $e^5$, and rods $e^6$ $e^7$ to the lever $e^2$, so that when the tightener $e'$ is drawn backward away from the belt $b$ the pulley $e^4$ will be pushed outward to throw the belt $b$ away from the opposite side of the pulley $c'$, so that it will not come in contact therewith and be worn by the friction of the constantly-revolving pulley. A simple bar or other mechanical device may be substituted for the pulley $e^4$, if preferred. The size of the pulley $c'$ is immaterial, as the back side of the belt $d'$ may hang out of the perpendicular. The front side of the belt $d'$, on the contrary, is usually hung and run in a direct line from one pulley to the other. Thus the rear line of the belt $d'$ may be run out away from a direct line far enough to increase the size of the pulley $c'$, as may be required. The action of the pulley $e^4$ prevents any interference or friction of the parts when the elevator is not running. By this simple arrangement of the shafting and belts I gain many important advantages. I dispense with a large amount of extra lines of shafting and ponderous machinery above the bins of the elevator, thereby avoiding the necessity of frequently readjusting the shafting caused by the settling and rising of the frame when the elevator is filled and emptied.

Each set of elevators or legs may be operated from below, where the operator can see just what is needed, thus saving much valuable time and a great reduction of power, and consequent saving of fuel, as the elevators need only be run when actually required.

The filling of the bins with grain causes the bins $A^2$ and roof-frame $A^3$ to settle to a certain extent, and then when the bins are emptied the frame and bins rise again, thus constantly changing the relative positions of the different parts of the frame, and causing the shafting to get out of line and require frequent readjustment. By my arrangement this readjustment is avoided, as only the short elevator-head shaft $a^2$ is placed on the frame $A^3$, and the rising and falling of the latter will not affect it further than a loosening or tightening of the belts slightly, but not to an extent greater than the tightener $e'$ can take up.

This driving-gear occupies no room in the building that could be utilized for any other purpose; hence no extra room is required for the system.

I do not wish to confine myself to the mechanism shown for operating the tightener, &c., as I am aware that many different means may be used for that purpose.

Any other suitable means than the tightener $e'$ may be used to connect the shafts $a'$ and $a^2$, if preferred.

This system may also be used in operating wire rope or chain belting by slight modifications.

Having described my invention and set forth its merits, what I claim is—

1. The belt $d'$, in combination with the driving-belt $b$ and tightener $e'$, placed inside of the said belt $d'$, substantially as set forth.

2. The combination of the main shaft $a'$, carrying the pulley $c'$, elevator-head shaft $a^2$, carrying the pulley $c^2$, boot-pulley $d^3$, bucket-belt $d'$, driving-belt $b$, and tightener $e'$, substantially as set forth.

3. The combination of the main shaft $a'$, carrying the pulley $c'$, elevator-head shaft $a^2$, carrying the elevator-head pulley $c^2$, boot-pulley $d^3$, bucket-belt $d'$, main driving-belt $b$, tightener $e'$, shifter-pulley $c^4$, and means, substantially as described, whereby the loosening of said tightener-pulley will cause said shifter-pulley to throw said main driving-belt loose from said main driving-pulley.

In testimony whereof I have hereunto set my hand in presence of two subscribing witnesses.

CHARLES ESPLIN.

Witnesses:
    LOUIS FEESER, Sr.,
    LOUIS FEESER, Jr.